No. 796,723. PATENTED AUG. 8, 1905.
P. C. HEWITT.
CARBURETER.
APPLICATION FILED APR. 9, 1904.
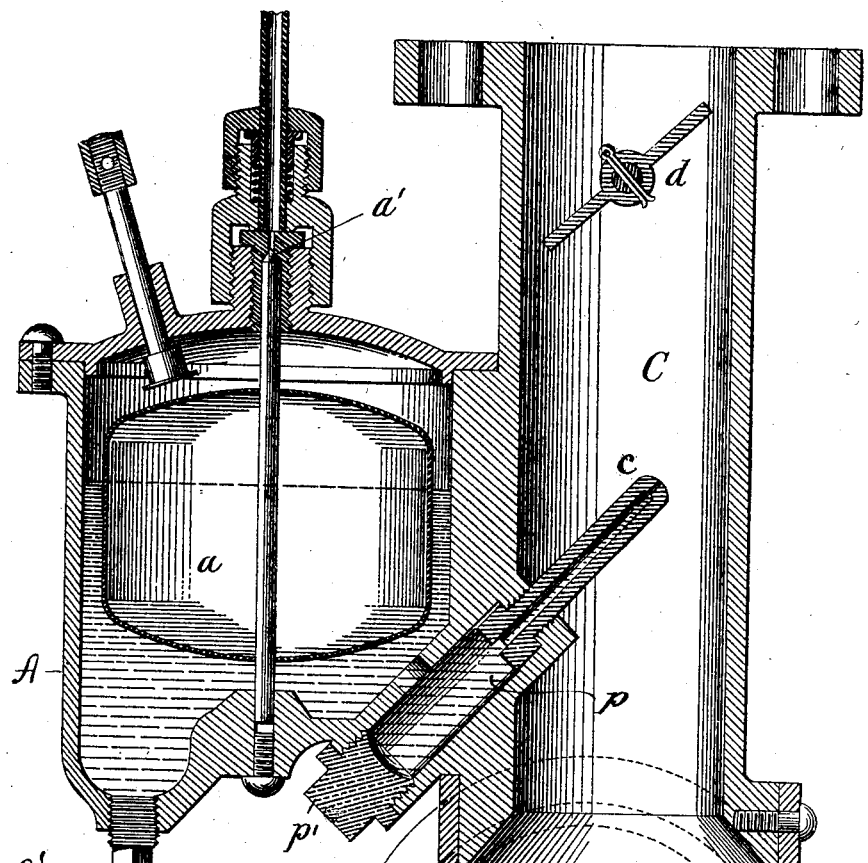
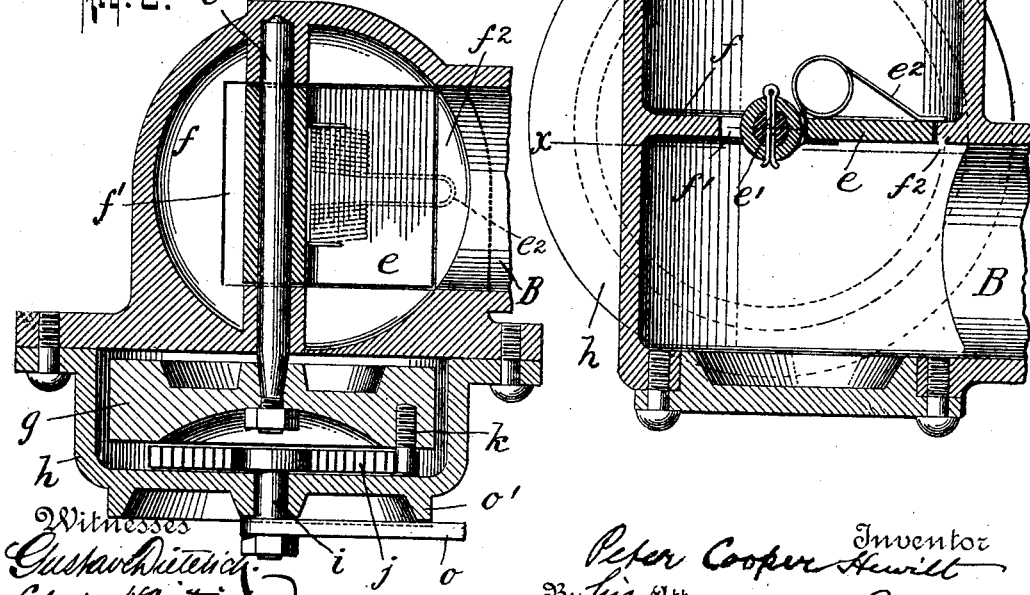

UNITED STATES PATENT OFFICE.

PETER COOPER HEWITT, OF NEW YORK, N. Y.

CARBURETER.

No. 796,723.   Specification of Letters Patent.   Patented Aug. 8, 1905.

Application filed April 9, 1904. Serial No. 202,285.

*To all whom it may concern:*

Be it known that I, PETER COOPER HEWITT, a citizen of the United States, residing in the city of New York, in the borough of Manhattan and State of New York, have invented certain new and useful Improvements in Carbureters, of which the following is a full, clear, and exact description.

This invention relates to improvements in carbureters or fuel-mixers for explosive-engines, and has special reference to means for supplying the liquid and gaseous material to the engine-cylinder in the proportions demanded or required by the varying speeds and powers of the engine.

The object of the invention is to provide a device capable of automatically accomplishing this result and whose functions will not be interfered with or deranged by the pulsations of the engine or vibrations of or shocks to the mechanism.

It is well understood that as the speed of the engine increases its suction upon the fuel mixture increases. The liquid fuel flows from the atomizing-nozzle into the mixing-chamber in proportion to the degree of vacuum or pressure in the mixing-chamber, and this is determined by the quantity of air or gaseous material admitted to the mixing-chamber as a result of the engine suction. If the orifice through which the air is admitted to the mixing-chamber remains constant in area, the pressure in the mixing-chamber will decrease with an increase in speed of the engine, and this will cause more liquid to enter the mixing-chamber, increasing the proportion of liquid to air, and resulting in a weaker explosive mixture. To keep up the speed, the force of the explosions must be maintained. Hence this upsetting of the proportions of the mixture is a defect in operation, and it is this defect that my invention is intended to remedy. I accomplish this result by providing a valve in the air or gaseous supply passage, which opens under suction against the tension of a spring, the orifice thus produced changing in area with the speed of the engine and automatically maintaining the desired pressure in the mixing-chamber and preserving the desired proportions of the mixture for varying speeds. This is aided in most cases by fitting this valve so that when closed it does not entirely close the passage. I also combine with said valve an inertia device, preferably in the form of a weighted wheel, which by its tendency to remain stationary will resist the pulsations of engine and the jars and vibrations to which the apparatus may be subjected, but will yield to the more prolonged normal suction changes, and thus render the action of the valve constant and uniform and its control of the air substantially in exact proportion to the requirements.

In the accompanying drawings, Figure 1 is a central section of a carbureter or vaporizer having my improvements applied thereto, and Fig. 2 is a section on line $x$ of Fig. 1.

Referring to the drawings by letter, A indicates the usual tank for gasolene or other liquid fuel, containing a float $a$, which controls the liquid-inlet valve $a'$, to maintain a constant level of the liquid in the chamber.

B is the air-inlet passage, communicating with a mixing passage or chamber C, wherein is located the nozzle $c$, through which the liquid is drawn by the suction of the engine.

$d$ is the usual throttle-valve, controlling the quantity of mixture admitted to the engine.

Between the mixing-chamber and the air-inlet is located a wing-valve $e$, consisting of a rectangular plate fixed to a shaft $e'$, pivoted in the walls of the passage, as shown in Fig. 2. This valve occupies a rectangular opening in a partition $f$, which, however, it does not entirely fill, an opening $f'$ being constantly unobstructed in all positions of the valve and having a capacity such as to supply the proper proportion of air for the mixture when the engine is running at its lowest speed. A loose-fitting valve would serve the same purpose. The valve is free to turn inward or outward; but it is normally prevented from turning outward by a spring-lip $e^2$, which is attached to the valve and strikes a ledge $f^2$ on the partition to hold the valve in its closed position, as shown. It will also yield and allow the valve to open outward in case of any back firing or internal pressure occurring from the engine side.

The shaft upon which the valve $e$ is hung projects through the casing and carries a weighted wheel $g$, which serves as an inertia device to resist forces suddenly or momentarily applied to the valve. This wheel is covered and protected by a box $h$, fastened to the outside of the valve-casing, and there is concentrically mounted in this box a short shaft $i$, which at its inner end is attached to the end of a spiral spring $j$, the opposite end of the spring being fastened to a stud $k$, fixed to the wheel $g$, near its periphery. The outer end of shaft $i$ carries a crank-arm and index $o$, by which the shaft can be rotated to adjust the tension of the spring and thereby its resistance to the forces tending to rotate wheel $g$ and valve $e$. This crank and index can be set at any position by engaging it with a notch in the flange $o'$.

The operation of the device is as follows: When the engine is running at its lowest speed, the supply of air for the mixture is drawn through the opening $f'$, the air passing therethrough mixing with the liquid spray that is at the same time drawn through the nozzle $c$, whence the mixture passes on to the engine. As the speed of the engine increases the suction in chamber C increases and more liquid is drawn into the chamber; but this increase of suction at the same time and in proportion thereto opens valve $e$ and enlarges the orifice through which air is admitted. The additional air raises the pressure in the chamber, preventing an oversupply of liquid, but maintaining the best proportions of mixture, notwithstanding the increasing consumption thereof. It will be seen that as valve $e$ opens the entrance of air is permitted at a rate progressing more rapidly than the movement of the valve, this being due to the shape of the valve and the throat through which the air passes. For this reason I use a spring $j$, that increases in tension as the valve opens, thereby admitting the air more nearly in direct proportion to the suction; but other forms of spring or springs may be used and their tension may be adjusted variously to accomplish certain results. For instance, the constantly-open port $f'$ need not be used if the spring is set to permit the valve to open upon the slightest suction in chamber C. Also a number of springs could be arranged to come into action successively in the progress of the valve's movement to compensate for variations in the orifice.

Now in case the apparatus is used on a vehicle or under any circumstances where it would be subjected to vibrations or shocks the inertia device $g$ will perform an important service, in that it will resist such disturbances and prevent fluctuations of the valve. Likewise the pulsations of the engine that occur at each suction-stroke will not cause the valve to vibrate, since they are not sufficiently prolonged to overcome the inertia of the wheel. At the same time the device is of such a nature that it will yield to respond to the more prolonged changes of suction and permit the valve to perform its functions. It is also to be seen that an inertia device in the form of a wheel will perform its functions under all conditions. It is a balanced device mounted upon a center and is quite as efficient in one position as another. It cannot be "flung," as an ordinary weight, by sudden movements or jolts, and when stationary it offers more resistance to turning than after it is in motion, being in this respect different from a fan or blades acting upon a fluid.

Having described my invention, I claim—

1. The combination with a valve-casing having a port, a valve controlling said port and arranged to be opened by the pressure of the fluid passing through it, and a spring arranged to resist the opening of the valve, of a movable weighted member being in a state of equilibrium in all positions to which moved by the valve, and arranged to cause by its inertia a retardation to the movement of the valve.

2. The combination of a valve-casing having a port, an oscillating valve controlling said port and arranged to be opened by the pressure of the fluid passing through it, a spring arranged to resist the opening of the valve, a weighted rotary member arranged to be turned by the valve and balanced in all positions to which moved by the valve.

3. In a carbureter, the combination with a valve arranged to control the supply of gaseous material to the mixing-chamber, of a movable weighted member moved by the valve, the member being in a state of equilibrium in all positions to which moved by the valve, and arranged to cause by its inertia a retardation to the movement of the valve.

4. The combination of a valve-casing having a port, an oscillating valve controlling said port and arranged to be opened by the pressure of the fluid passing through it, a weighted wheel secured on the spindle of the valve and balanced in all positions, a coil-spring secured at one end to the wheel, and having its other end adjustably secured to the valve member.

In witness whereof I subscribe my signature in presence of two witnesses.

PETER COOPER HEWITT.

Witnesses:
   FRANK S. OBER,
   WALDO M. CHAPIN.